(12) United States Patent
Conover

(10) Patent No.: US 8,838,913 B1
(45) Date of Patent: Sep. 16, 2014

(54) SYSTEM AND METHOD FOR LOCATING A MEMORY PAGE IN A GUEST VIRTUAL MACHINE

(75) Inventor: Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1282 days.

(21) Appl. No.: 12/560,036

(22) Filed: Sep. 15, 2009

(51) Int. Cl.
*G06F 12/00* (2006.01)
*G06F 9/44* (2006.01)
*G06F 9/455* (2006.01)
*G06F 12/08* (2006.01)

(52) U.S. Cl.
CPC ..................... *G06F 12/08* (2013.01)
USPC ........ 711/154; 711/E12.016; 711/6; 717/174; 718/1

(58) Field of Classification Search
CPC ....................................... G06F 12/08
USPC ............................ 711/6, 154; 717/174; 718/1
See application file for complete search history.

(56) References Cited

U.S. PATENT DOCUMENTS

| | | | | |
|---|---|---|---|---|
| 6,473,840 B2* | 10/2002 | Matthews et al. | ............. | 711/154 |
| 7,433,951 B1* | 10/2008 | Waldspurger | ................ | 709/226 |
| 8,055,874 B2* | 11/2011 | Kim | ............................. | 711/171 |
| 2004/0117594 A1* | 6/2004 | VanderSpek | .................. | 711/209 |
| 2006/0248528 A1* | 11/2006 | Oney et al. | ........................ | 718/1 |
| 2009/0241109 A1* | 9/2009 | Vandegrift et al. | ............... | 718/1 |

* cited by examiner

*Primary Examiner* — Aracelis Ruiz
(74) *Attorney, Agent, or Firm* — Campbell Stephenson LLP

(57) ABSTRACT

A system and method for locating a memory page in a guest virtual machine are provided. An execution event is triggered, in response to a request to allocate a first memory page in a virtual machine. A processor sends an indication to a hypervisor that the first memory page has been allocated in the virtual machine, in response to the triggering of the execution event. Responsive to receiving the indication, a security virtual machine appropriates control, via the hypervisor, of the first memory page allocated in the virtual machine and inserts program code in the first memory page. The processor executes the program code. The security virtual machine relinquishes control of the first memory page allocated in the virtual machine, in response to determining the program code has completed execution.

21 Claims, 6 Drawing Sheets

SYSTEM AND METHOD FOR LOCATING A MEMORY PAGE IN A GUEST VIRTUAL MACHINE

FIELD OF THE INVENTION

This invention relates to data processing systems, and in particular, managing virtual data processing systems.

DESCRIPTION OF THE RELATED ART

As modern computer systems become more powerful, the use of hardware and software virtualization to implement virtual machines is becoming more common. Virtual machines are software implementations of a physical computer that execute computer instructions in the manner of physical computer hardware. Whether a single computer or a group of networked computers, many (if not most) of today's computer systems are able to act as a host computer system to multiple virtual machines.

A computer system supporting multiple virtual machines typically does so, at least in part, through the use of system software and/or hardware that manages the host computer system's resources in a manner that allows the host computer system to present a hosted virtual environment in each of the virtual machines. In so doing, each virtual machine is able to operate as if the host computer system were solely under its control, and so share the host computer system's resources. For example, the host computer system will typically include at least one processor and system memory. The aforementioned system software and/or hardware support the sharing of these resources by providing processor resources and memory management to each of the virtual machines. Such virtualization functionality can be provided, for example, through the use of a system virtual machine (sometimes referred to as a hardware virtual machine), which allows the sharing of the underlying physical machine resources between different virtual machines, each running its own operating system (OS; which can vary from virtual-machine-to-virtual-machine, or can be the same OS across all virtual machines).

However, in order for the virtual machines to successfully co-exist with one another, the system software and/or hardware also needs to be able to coordinate and manage these demands for host computer system resources, typically. These needs are addressed by a virtualization component (e.g., a software abstraction layer) that is commonly referred to as a "hypervisor." A hypervisor can be executed on "bare hardware" (i.e., executed on physical hardware, without the need for intervening software; and which is also referred to as a native virtual machine), or alternatively, can interface with the physical hardware via an operating system (also referred to a hosted virtual machine). As will be appreciated, however, one or more of a hypervisor's functions can be implemented directly in hardware, rather than being implemented in software. Using the foregoing example, a hypervisor supports multiple virtual machines by coordinating processor resources to support the execution of instructions on behalf of the various virtual machines, and performing memory management to help ensure that the virtual machines effectively share the host computer's system memory, for example.

A computer system supporting multiple virtual machines in such a manner can offer security benefits, such as the isolation of one virtual machine from another. For example, if one virtual machine becomes corrupted due to, for example, malicious software that alters the behavior of the virtual machine without the user's knowledge, the malicious software corruption is less likely to spread to the other virtual machines supported by the computer system. However, such isolation often comes at a price. For example, operations internal to the virtual machine cannot be reliably determined by software and/or hardware systems that are external to the virtual machine.

What is therefore desirable is a system and method for managing and manipulating the internal operations of a virtual data processing system.

SUMMARY OF THE INVENTION

According to an embodiment of the present invention, an execution event is triggered, in response to a request to allocate a first memory page in a virtual machine. A processor sends an indication to a hypervisor that the first memory page has been allocated in the virtual machine, in response to the triggering of the execution event. Responsive to receiving the indication, a security virtual machine appropriates control, via the hypervisor, of the first memory page allocated in the virtual machine and inserts program code in the first memory page. The processor executes the program code. The security virtual machine relinquishes control of the first memory page allocated in the virtual machine, in response to determining the program code has completed execution.

Further, according to another embodiment of the present invention, the indication is a message. The message indicates that the first memory page has been allocated in the virtual machine.

Further, according to another embodiment of the present invention, a virtual appliance application determines if the first memory page allocated in the virtual machine meets predetermined criteria.

Further, according to another embodiment of the present invention, the predetermined criteria include a size of the first memory page.

Further, according to another embodiment of the present invention, the predetermined criteria include a pageable nature of the first memory page.

Further, according to another embodiment of the present invention, the program code is an in-guest agent code.

Further, according to another embodiment of the present invention, the execution event is installed in a second memory page including program code for allocating the first memory page.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Figure 1:
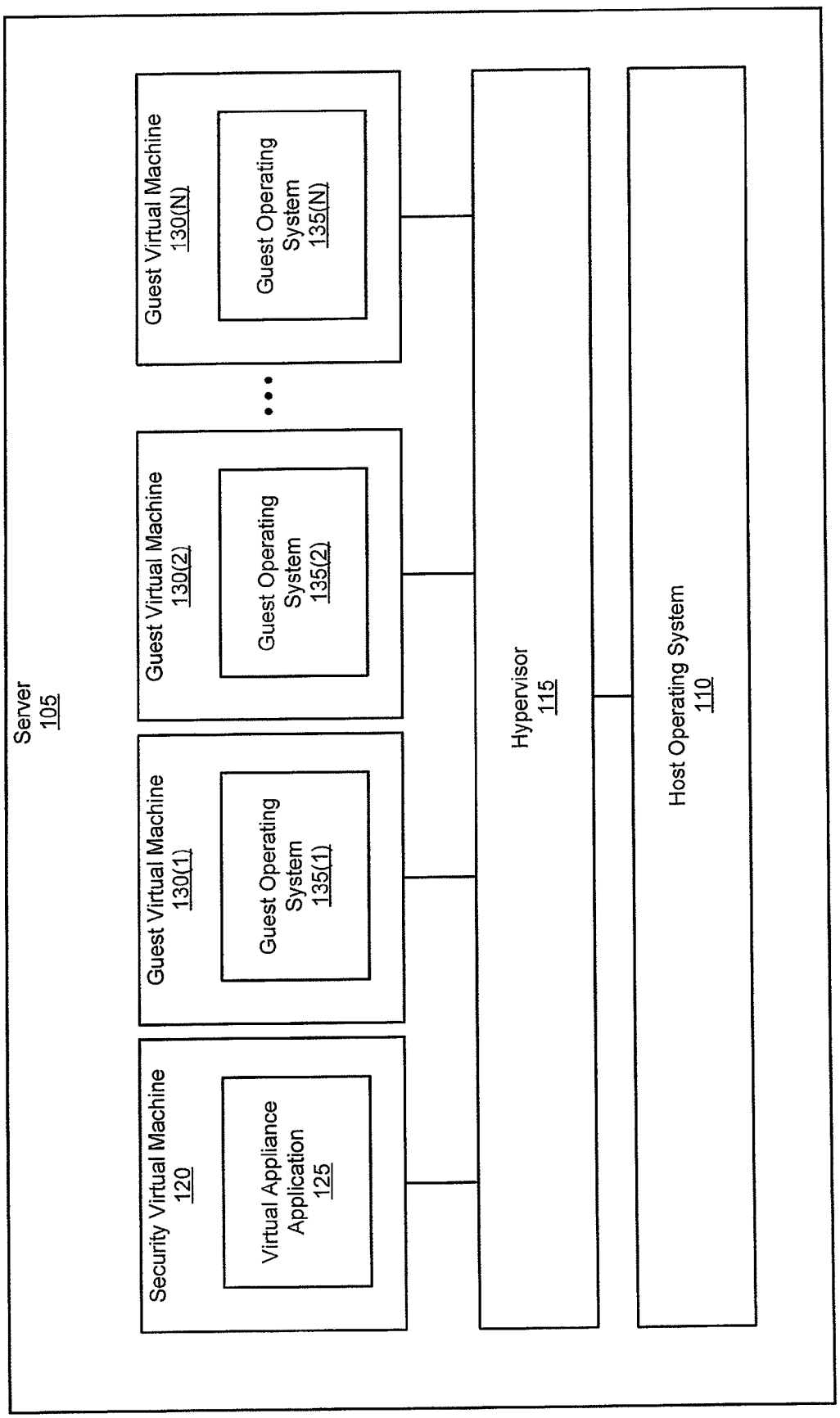
FIG. 1 is a block diagram illustrating a server that can be implemented as a host computer system, according to one embodiment.

An advantageous feature of a host computer system that supports at least one virtual machine is the ability to support the execution of more than one operating system (OS) at a time. For example, a host computer system can execute a host OS such as, for example Mac OS X®. A hypervisor such as, for example, Parallels Desktop® 4.0, can be used to provide the ability for the host computer to implement multiple virtual machines. In such an architecture, each of the virtual machines (also referred to herein as a "guest virtual machine") executes a corresponding OS (referred to herein as a "guest operating system"). Some operating systems that can be implemented within the guest virtual machines as guest operating systems include, but are not limited to, Windows XP®, Windows Vista®, Linux, Mac OS X®, and the like. A given guest operating system is thus executed within a corresponding one of the guest virtual machines.

As a result of this architecture, the guest virtual machines are logically isolated from one another, as noted. This logical isolation provides many benefits, including, but not limited to, security benefits. For example, if a guest virtual machine becomes corrupted by malicious software, a system administrator can remove the corrupted guest virtual machine and install a new replacement guest virtual machine without affecting the operation of other guest virtual machines executing on the host computer.

Despite these benefits, the logical isolation afforded by this architecture also presents various difficulties to software and/or hardware implemented outside of the guest virtual machines. For example, some host computer systems implement a security virtual machine to perform various functions such as, but not limited to, installing software updates to the guest OS, scanning for viruses and other malicious software, maintaining security software (e.g., software firewall, etc.), and logging software loaded by the guest OS for debugging purposes. The security virtual machine can be implemented on the host computer, in addition to the guest virtual machines. However, in order to perform these tasks, the security virtual machine needs to easily and accurately monitor the internal operations of the guest virtual machines, as well as gain access to the guest virtual machines, which is made difficult by the aforementioned logical isolation.

One technique for a security virtual machine to gain access to a guest virtual machine involves taking control of the operations of the guest virtual machine using an in-guest agent. According to an embodiment of the present invention, an in-guest agent can be implemented as a software module, resident at a memory location in the guest virtual machine, which retrieves information from and exercises control over the guest virtual machine. The in-guest agent acts as a portal through which the security virtual machine can access the guest virtual machine. Maintaining a permanent in-guest agent is undesirable because the permanent in-guest agent can be compromised by malicious software. Thus, it is desirable to maintain in-guest agents within a guest virtual machine only when the in-guest agent is needed by the security virtual machine to access the guest virtual machine. The in-guest agent is inserted into the guest virtual machine by injecting the in-guest agent code into a memory page within the guest virtual machine and executing the in-guest agent code. However, the guest virtual machines operate on the assumption that no other entity can read or write to the guest virtual machine's memory. Arbitrarily taking control of a memory page within a guest virtual machine (without coordinating with the guest virtual machine) can result in data corruption and execution errors since that memory page can store data germane to a process executing on the guest virtual machine.

Embodiments of the present invention provide location of memory pages for in-guest agent code injection within a guest virtual machine by examining pages allocated by the guest virtual machine, determining if the allocated page meets a predefined criteria, taking control of the page from the guest virtual machine, injecting in-guest agent code, executing the in-guest agent code, and returning control of the memory page to the guest virtual machine.

An Example Architecture for Locating a Memory Page in a Guest Virtual Machine

FIG. 1 is a simplified block diagram that illustrates a server that can be used to communicate with clients. For example, as described subsequently in conjunction with FIG. 4, a server can communicate with clients via a direct connection or a connection via a network, such as the Internet. Those with skill in the art will appreciate that a server is only an example of any number of computer systems that can be used. As illustrated, server 105 includes a host operating system 110, a hypervisor 115, a security virtual machine 120, which further includes a virtual appliance application 125, and guest virtual machines 130(1)-(N), which further include guest operating systems 135(1)-(N).

Host operating system 110 is the OS that underlies hypervisor 115, security virtual machine 120, and guest virtual machines 130(1)-(N). Hypervisor 115 is software and/or hardware that provides server 105 the ability to concurrently execute multiple guest operating systems (e.g., guest operating systems 135(1)-(N)) via guest virtual machines 130(1)-(N). Also, as illustrated, server 105 includes a security virtual machine 120, which executes virtual appliance application 125. According to an embodiment of the present invention, virtual appliance application 125 (executing on security virtual machine 120) performs maintenance, diagnostic, and/or recovery operations, as necessary. However, in order to perform these operations, virtual appliance application 125, executing on security virtual machine 120, first loads (or injects) in-guest agent code within guest virtual machines 130 (e.g., guest virtual machine 130(1)). The injected in-guest agent code can be executed later, in order to allow virtual appliance application 125 to perform the desired operations.

In order to inject in-guest agent code into a guest virtual machine, a memory page within the guest virtual machine is needed in order to receive the in-guest agent code. According to an embodiment of the present invention, a technique used to monitor available memory in a guest virtual machine includes hooking a memory allocation function and notifying a virtual appliance application that the memory allocation function has been called. Such "function hooking" is described herein in more detail in conjunction with FIGS. 3A-3B.

Figure 2:
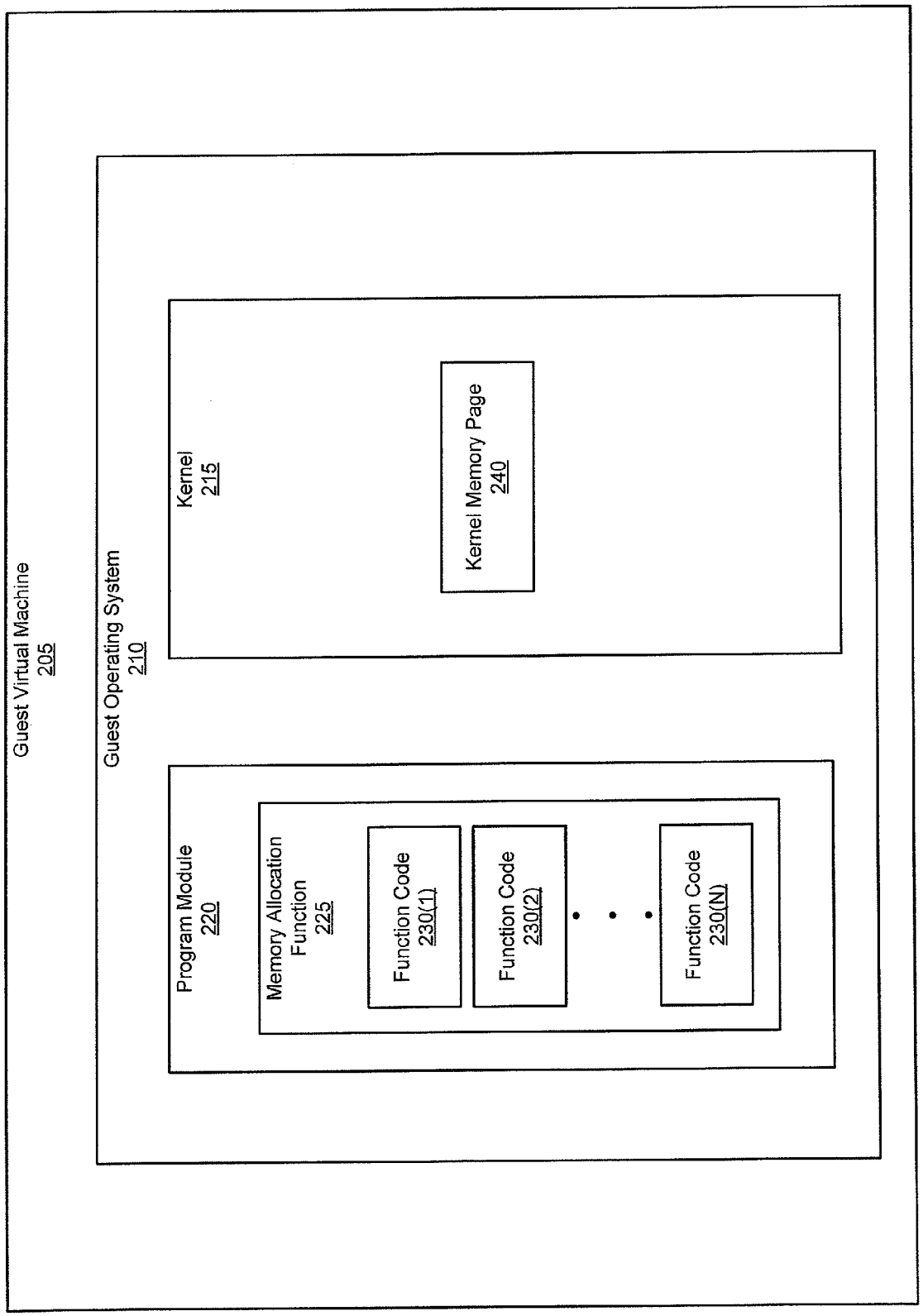
FIG. 2 is a block diagram is a block diagram illustrating a guest virtual machine, according to one embodiment.

FIG. 2 is a block diagram of a guest virtual machine with program code for allocating memory pages. As illustrated, guest virtual machine 205 (which can be used to implement guest virtual machine 130(1)-(N) of FIG. 1) includes a guest operating system 210 (which can be used to implement guest operating systems 135(1)-(N) of FIG. 1). Guest operating system 210 further includes a kernel 215 and program module 220.

Kernel 215 is a basic component of guest operating system 210 and is responsible for managing system resources of guest virtual machine 205. For example, kernel 215 manages the communication between hardware and software components within guest virtual machine 205.

One such software component is program module 220 that includes computer-readable instructions. When processed by a computer system, the computer-readable instructions accomplish a desired task. The computer system, whether real or virtual, performs many different tasks through various hardware and software components. For example, a computer system can accomplish these tasks by performing function calls to effect the desired operation(s). Examples of functions that a computer system might employ include functions that cause a video adapter to display image data on the computer system's video display, those that cause an input/output (I/O) adapter to accept input presented by an input device, those that cause a storage adapter to enable read and write access to a storage device (e.g., hard disk drive, flash drive, or the like), and those that cause an anti-virus utility to scan various storage devices of the computer system for malicious software, among a wide variety of such functions and others.

As illustrated, program module 220 further includes a memory allocation function 225, which, when executed, allocates a memory page (e.g., kernel memory page 240) within guest virtual machine 205. According to one embodiment of the present invention, memory allocation function 225 can be implemented using a memory allocation routine, such as an ExAllocatePool Function as used by a Microsoft Windows® operating system. Memory allocation function 225 also includes a collection of function code that is further divided into multiple memory pages. While FIG. 2 illustrates the function code as stored on multiple memory pages (e.g., Function Code 230(1)-(N)), it should be understood that the function code can be stored on a single memory page as well.

According to one embodiment of the present invention, during program execution, program module 220 allocates memory pages in order to perform tasks. For example, program module 220 can allocate memory pages to store data generated during the task. In order to allocate memory pages, program module 220 calls memory allocation function 225. Memory allocation function 225 allocates a memory page (e.g., kernel memory page 240) and uses a return instruction to return control of program execution to program module 220. The return instruction (not pictured) can be located at any of the pages illustrated by function code 230(1)-(N).

Figure 3A:
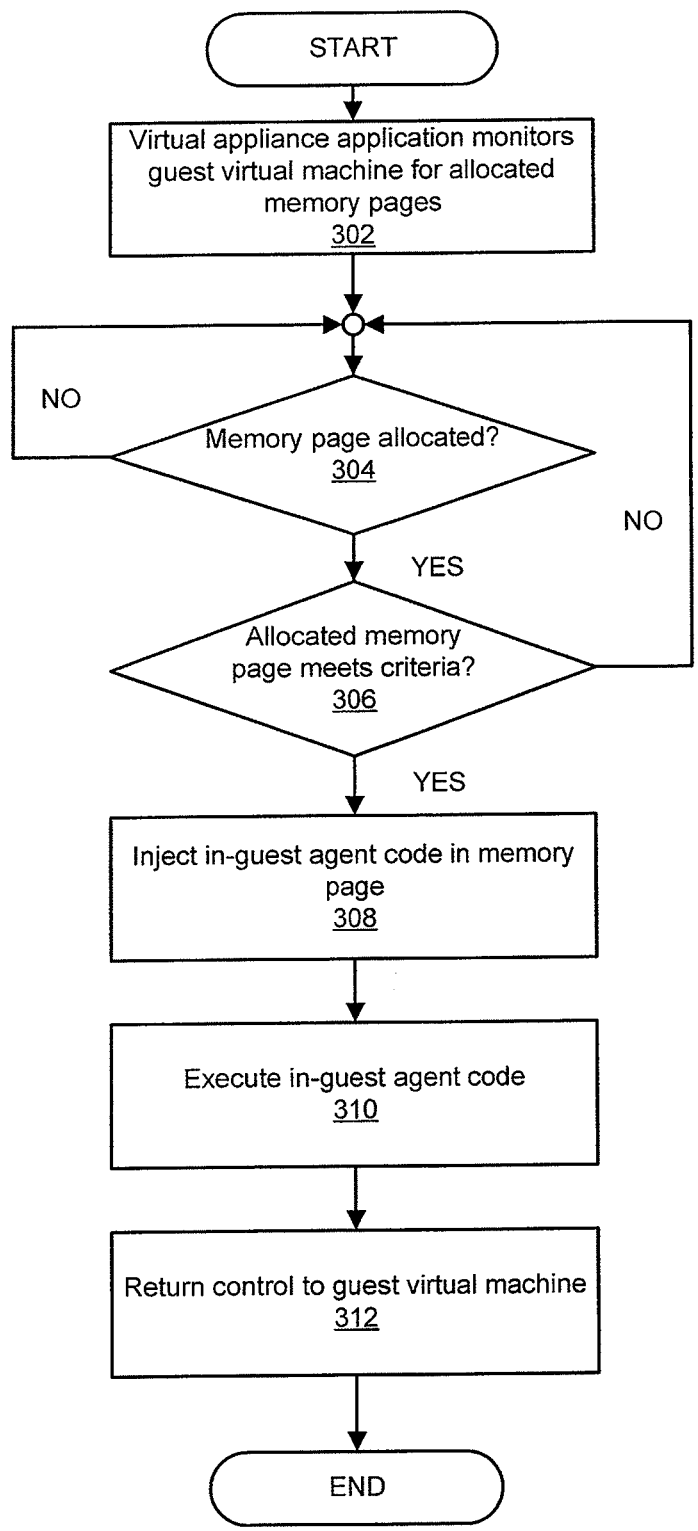
FIG. 3A is a high-level flowchart illustrating a general method for locating a memory page in a guest virtual machine, according to one embodiment.

FIG. 3A is a simplified flowchart illustrating an example general method for locating a memory page in a guest virtual machine (e.g., guest virtual machine 130(1) of FIG. 1 or guest virtual machine 205 of FIG. 2). The process of FIG. 3A begins with a virtual appliance application (e.g., virtual appliance application 125 of FIG. 1) monitoring a guest virtual machine for allocated memory pages, as shown in 302. When the guest virtual machine allocates a memory page (304), the virtual appliance application determines if the allocated memory page meets certain predetermined criteria, as shown in 306. For example, the virtual appliance application determines if the allocated memory page is large enough for the virtual appliance application's use or whether or not the allocated memory page is a pageable memory page. If the virtual appliance application determines that the allocated memory page meets the predetermined criteria, the virtual appliance application injects (or loads) the in-guest agent code in the memory page, as shown in 308. The virtual appliance application executes the in-guest agent code to perform a desired task, as shown in 310. When the in-guest agent code execution is complete, the virtual appliance application returns control of the memory page to the guest virtual machine, as shown in 312.

Figure 3B:
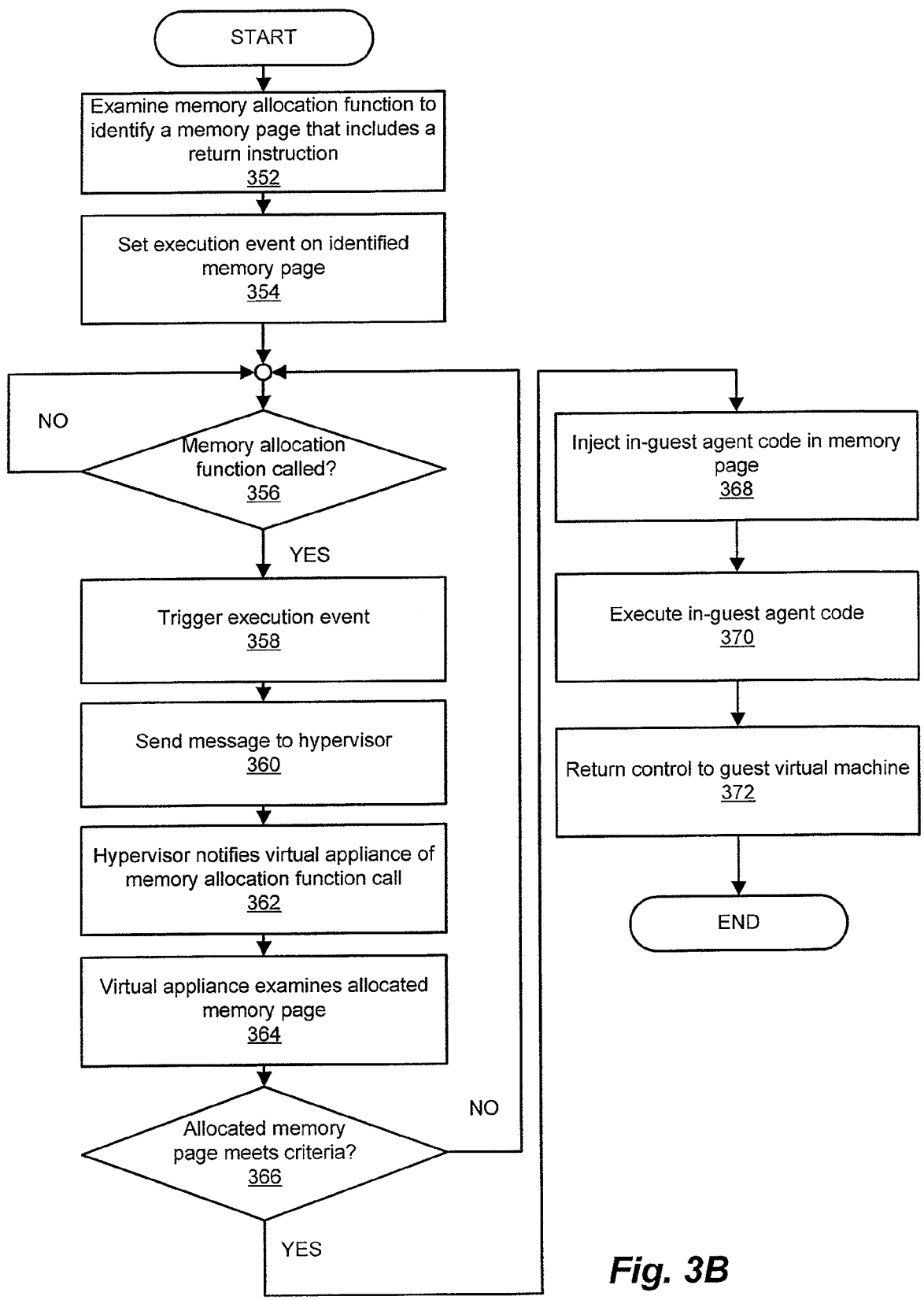
FIG. 3B is a high-level flowchart illustrating a method for locating a memory page in a guest virtual machine, according to one embodiment.

FIG. 3B is a simplified flowchart illustrating an example method for locating a memory page in a guest virtual machine (e.g., guest virtual machine 130(1) of FIG. 1 or guest virtual machine 205 of FIG. 2). The process of FIG. 3B begins with a virtual appliance application (e.g., virtual appliance application 125 of FIG. 1) examining the memory pages (e.g., function code 230(1)-(N) of FIG. 2) of a memory allocation function (e.g., memory allocation function 225 of FIG. 2) to locate a return instruction within the memory allocation function (e.g., a return instruction (not pictured) located on the memory page illustrated by function code 230(N)), as shown in 352.

The virtual appliance application installs an execution event on the identified memory page that includes the return instruction, as shown in 354. The execution event, when triggered, sends a message to notify a hypervisor (e.g., hypervisor 115 of FIG. 1) that the memory allocation function has been called by the guest virtual machine. The consequence of calling (e.g., by the guest virtual machine) the memory allocation function (shown in 356) is that a memory page (e.g., kernel memory page 240 of FIG. 2) is allocated in the guest virtual machine, and the execution event is triggered, as shown in 358.

When the execution event is triggered, the processor executing the execution event sends a message to the hypervisor, as shown in 360. Upon receipt of the message, the hypervisor notifies the virtual appliance application of the memory allocation function call, as shown in 362. The virtual appliance application examines the allocated memory page to determine if the memory page fits a set of predetermined criteria, as shown in 364. According to one embodiment of the present invention, whether the allocated memory page is acceptable for in-guest agent code injection depends on the size of the in-guest agent code (and thus, the size of the memory page required), and the location of the memory page, as well as whether the memory page is non-pageable. A non-pageable memory page is a memory page that remains in physical memory and is not transferred to an auxiliary memory store such as, for example, a hard disk drive or other type of memory device, in order to free space in the physical memory. It is understood that other criteria can be used to determine if the allocated memory page can be used for in-guest agent code injection.

If the allocated memory page meets the required predetermined criteria (as shown in 366), the virtual appliance application injects the in-guest agent code into the memory page, as shown in 368. The processor executes the in-guest agent code, as shown in 370. When the in-guest agent code execution completes, the virtual appliance application returns control of the memory page to the guest virtual machine, as shown in 372.

An Example Computing Environment

Elements of network architecture can be implemented using a variety of computer systems and networks. An example of one such network environment is described below with reference to FIG. 4.

Figure 4:
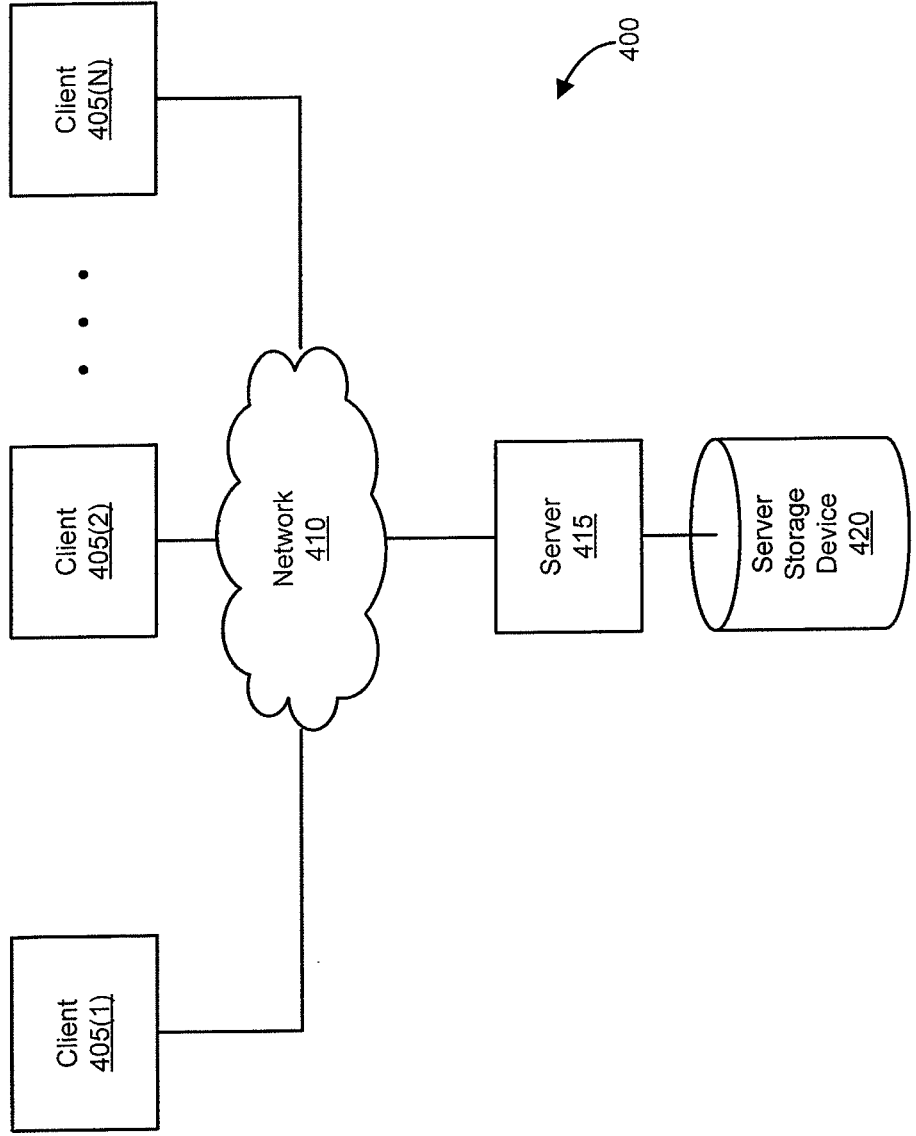
FIG. 4 is a block diagram illustrating a network architecture in which an embodiment of the present invention can be implemented.

FIG. 4 is a simplified block diagram illustrating a network architecture 400 in which one or more clients are provided with access to a server via various network connections. As depicted in FIG. 4, clients 405(1)-(N) are coupled to a network 410, and are able to access a server 415 (which can be used to implement server 105 of FIG. 1) via network 410. A client can be implemented using, for example, a desktop computer, a laptop computer, a workstation, a server, a cell phone, a smart phone, a network-enabled personal digital assistant (PDA), or the like. An example of network 410, which can be used by clients 405(1)-(N) to access server 415, is the Internet. Alternatively, access to server 415 can be provided by a local area network (LAN) utilizing Ethernet, IEEE 802.11x, or some other communications protocol. As will be appreciated, server 415 can be accessed by clients coupled directly thereto (not shown).

As also depicted on FIG. 4, server 415 is coupled to a server storage device 420. Server storage device 420 can be implemented as a single storage device or a collection of storage devices. Server storage device 420 can also be implemented as a storage area network, which couples remote storage devices to a server (e.g., server 415), such that the remote storage devices appear as locally-attached storage devices to the server's OS, for example.

In light of the present disclosure, those of skill in the art will appreciate that server storage device 420 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 400 can include other components such as routers, firewalls and the like that are not germane to the discussion of the present network and will not be discussed further herein. Those of skill in the art will also appreciate that other configurations are possible. For example, clients 405(1)-(N) can be directly coupled to server storage device 420 without the user of a server or Internet; server 415 can be used to implement both the clients and the server; network architecture 400 can be implemented without the use of clients 405(1)-(N); and so on.

Figure 5:
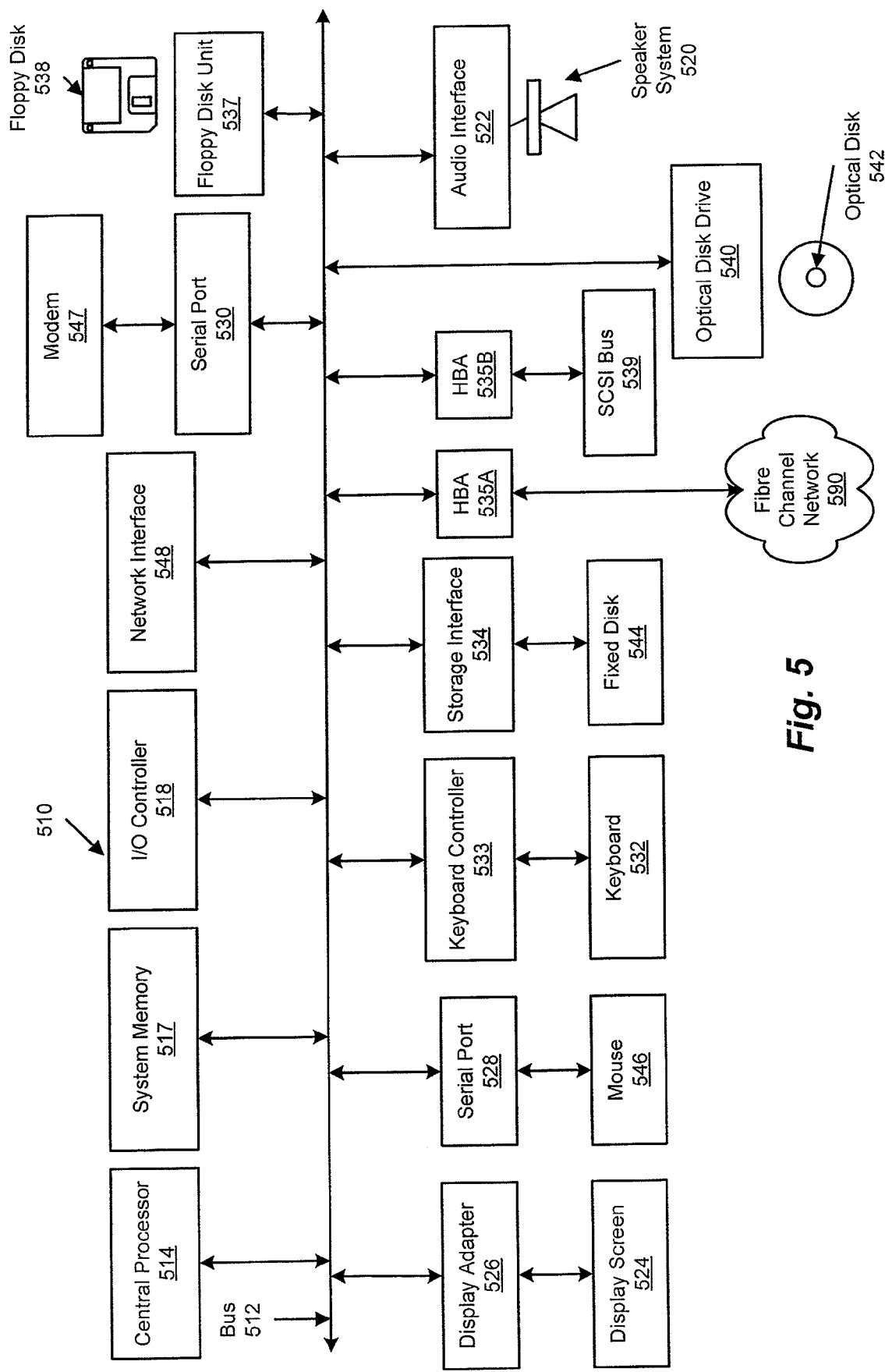
FIG. 5 is a block diagram that illustrates an example of a computer system suitable for implementing embodiments of the present invention.

FIG. 5 depicts a block diagram of a computer system 510 suitable for implementing a server (e.g., server 115 of FIG. 1), as well as the clients (e.g., clients 105(1)-105(N) of FIG. 1) used therein. Computer system 510 includes a bus 512, which interconnects major subsystems of computer system 510, such as a central processor 514, a system memory 517 (typically random-access memory (RAM), but which may also include read-only memory (ROM), flash ROM, or the like), an input/output controller 518, an external audio device, such as speaker system 520 via an audio output interface 522, an external device, such as a display screen 524 via display adapter 526, serial ports 528 and 530, a keyboard 532 (interfaced with keyboard controller 533), a storage interface 534, a floppy disk drive 537 operative to receive a floppy disk 538, a host bus adapter (HBA) interface card 535A operative to connect with a Fibre Channel network 590, a host bust adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 510 are generally stored on and accessed via a computer-readable storage medium, such as hard disk drive (e.g., fixed disk 544), an optical drive (e.g., optical drive 540), a floppy disk unit 537, or other computer-readable storage media.

Storage interface 534, as with other storage interfaces of computer system 510, can connect to a standard computer-readable storage medium for storage and/or retrieval of information, such as a fixed disk drive 544. Fixed disk drive 544 may be a part of computer system 510, or may be separate and accessed through other interface systems. Modem 547 can be employed to provide a direct connection to a remote server via a telephone link or to the Internet via an internet service provider (ISP). Network interface 548 may provide a direct connection to a remote server via a direct network link to the Internet via a point-of-presence (POP). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 5 need not be present. The devices and subsystems can be interconnected in different ways from that shown in FIG. 5. The operation of the computer system such as that shown in FIG. 5 is readily known in the art and is not discussed in detail in this application. Code to implement the previously-described features can be stored in computer-readable storage media such as one or more of system memory 517, fixed disk 544, optical disk 542, or floppy disk 538. The OS provided on computer system 510 can be, for example, MS-DOS®, MS-WINDOWS®, OS/2®, UNIX®, Linux®, or other known OS.

An example implementation of computer system 510, server 105 can store host operating system 110, hypervisor 115, security virtual machine 120, and guest virtual machines 130(1)-(N), all of FIG. 1, in computer-readable storage media (e.g., memory 517 and the like). Also, network interface 548 may be used by any of the modules described in server 105 and guest virtual machine 205. For example, the virtual machine manager can send and receive notifications concerning functions called within server 105 or in other parts of a network, as indicated in FIG. 4.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   in response to a request to allocate a first memory page in a virtual machine, triggering an execution event, wherein
      the execution event is installed on a second memory page;
   in response to the triggering of the execution event,
      sending a message to a hypervisor that the first memory page has been allocated in the virtual machine; and
   in response to receipt of the message,
      determining whether the first memory page meets a predetermined criteria, and
      in response to a determination that the first memory page meets the predetermined criteria,
         appropriating control of the first memory page, wherein
            control of the first memory page is temporarily appropriated by an another virtual machine via the hypervisor,
         inserting program code in the first memory page,
         executing the program code, and
         in response to a determination that the program code has completed execution,
            relinquishing control of the first memory page.

2. The method of claim 1, wherein the message indicates that the first memory page has been allocated in the virtual machine.

3. The method of claim 1, wherein the determining comprises:
   determining whether the first memory page is pageable;
   determining a size of the program code; and
   determining a size of the first memory page.

4. The method of claim 3, further comprising:
   determining whether the program code fits in the first memory page by comparing the size of the program code and the size of the first memory page.

5. The method of claim 4, further comprising:
   if the program code fits in the first memory page and the first memory page is pageable,
      indicating that the first memory page meets the predetermined criteria, and otherwise,
      indicating that the first memory page does not meet the predetermined criteria.

6. The method of claim 1, wherein
   the predetermined criteria comprise
      a size of the first memory page.

7. The method of claim 1, wherein
   the predetermined criteria comprise
      a pageable nature of the first memory page.

8. The method of claim 1, wherein
   the program code is an in-guest agent code, and
   the predetermined criteria comprise at least one of
      a location of the first memory page,
      a pageable nature of the first memory page,
      a size of the in-guest agent code, or
      a size of the first memory page.

9. The method of claim 1, further comprising
   installing the execution event in a second memory page, wherein
      the second memory page comprises program code, and
      the program code is configured to allocate the first memory page.

10. The method of claim 1, further comprising:
    allocating the first memory page in the virtual machine.

11. A computer system comprising:
    at least one processor;
    a computer-readable storage medium coupled to the at least one processor; and
    computer code, encoded in the computer-readable storage medium, configured to cause the at least one processor to
       trigger an execution event, in response to a request to allocate a first memory page in a virtual machine, wherein
          the execution event is installed on a second memory page,
       send a message to a hypervisor that the first memory page has been allocated in the virtual machine, in response to the triggering of the execution event, and
       responsive to receipt of the message,
          determine whether the first memory page meets a predetermined criteria, and
          responsive to a determination that the first memory page meets the predetermined criteria,
             appropriate control of the first memory page, wherein
                control of the first memory page is temporarily appropriated by an another virtual machine via the hypervisor,
             insert program code in the first memory page,
             execute the program code, and
             relinquish control of the first memory page, in response to a determination that the program code has completed execution.

12. The computer system of claim 11, wherein the computer code configured to cause the processor to determine is further configured to cause the processor to:
    determine whether the first memory page is pageable;
    determine a size of the program code; and
    determine a size of the first memory page.

13. The computer system of claim 11, wherein
    the predetermined criteria comprise
       a size of the first memory page.

14. The computer system of claim 11, wherein
    the predetermined criteria comprise
       a pageable nature of the first memory page.

15. The computer system of claim 11, wherein
    the program code is an in-guest agent code, and
    the predetermined criteria comprise at least one of
       a location of the first memory page,
       a pageable nature of the first memory page,
       a size of the in-guest agent code, or
       a size of the first memory page.

16. The computer system of claim 11, wherein the computer code is further configured to cause the processor to:
    install the execution event in a second memory page, wherein
       the second memory page comprises program code, and
       the program code is configured to allocate the first memory page.

17. A non-transitory computer-readable storage medium comprising:
- computer code, wherein
  - the computer code, when executed, is configured to cause a processor to trigger an execution event, in response to a request to allocate a first memory page in a virtual machine, wherein
    - the execution event is installed on a second memory page,
  - send a message to a hypervisor that the first memory page has been allocated in the virtual machine, in response to the triggering of the execution event, and
  - responsive to receipt of the message,
    - determine whether the first memory page meets a predetermined criteria, and
    - responsive to a determination that the first memory page meets the predetermined criteria,
      - appropriate control of the first memory page, wherein
        - control of the first memory page is temporarily appropriated by an another virtual machine via the hypervisor,
      - insert program code in the first memory page,
      - execute the program code, and
      - relinquish control of the first memory page, in response to a determination that the program code has completed execution.

18. The non-transitory computer-readable storage medium of claim 17, wherein the computer code configured to cause the processor to
- determine comprises computer code configured to cause the processor to:
- determine whether the first memory page is pageable;
- determine a size of the program code; and
- determine a size of the first memory page.

19. The non-transitory computer-readable storage medium of claim 17, wherein
- the predetermined criteria comprise
  - a size of the first memory page.

20. The non-transitory computer-readable storage medium of claim 17, wherein
- the predetermined criteria comprise
  - a pageable nature of the first memory page.

21. The non-transitory computer-readable storage medium of claim 17, wherein the computer code, when executed, is further configured to cause the processor to:
- install the execution event in a second memory page, wherein
  - the second memory page comprises program code, and the program code is configured to allocate the first memory page.

* * * * *